(12) United States Patent
Ooe

(10) Patent No.: US 8,312,979 B2
(45) Date of Patent: Nov. 20, 2012

(54) WORKPIECE CONVEYING EQUIPMENT

(75) Inventor: Masahiro Ooe, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 13/412,985

(22) Filed: Mar. 6, 2012

(65) Prior Publication Data

US 2012/0160635 A1    Jun. 28, 2012

Related U.S. Application Data

(63) Continuation of application No. PCT/JP2010/065257, filed on Sep. 6, 2010.

(30) Foreign Application Priority Data

Sep. 15, 2009    (JP) .................................. 2009-212765

(51) Int. Cl.
*B65G 35/06*    (2006.01)
*B65G 47/52*    (2006.01)

(52) U.S. Cl. .............. 198/346.1; 198/370.08; 198/465.1

(58) Field of Classification Search ............... 198/346.1, 198/370.02, 370.03, 370.08, 463.3, 465.1, 198/465.2, 465.3; 104/102, 163
See application file for complete search history.

(56) References Cited

U.S. PATENT DOCUMENTS

| | | | | |
|---|---|---|---|---|
| 3,592,333 | A | * | 7/1971 | Sullivan et al. ............... 198/349 |
| 3,690,435 | A | * | 9/1972 | King et al. .................. 198/463.3 |
| 6,959,141 | B1 | * | 10/2005 | Ichikawa et al. ............. 386/353 |
| 2004/0261648 | A1 | * | 12/2004 | Nishihara et al. ............. 104/163 |
| 2006/0283687 | A1 | * | 12/2006 | Heinemeier et al. ........ 198/345.3 |
| 2010/0000440 | A1 | * | 1/2010 | Meinzinger .................. 104/102 |

FOREIGN PATENT DOCUMENTS

| | | |
|---|---|---|
| JP | 175020 U | 5/1989 |
| JP | 4362459 A | 12/1992 |
| JP | 5246538 A | 9/1993 |
| JP | 7041161 A | 2/1995 |
| JP | 2000229727 A | 8/2000 |

OTHER PUBLICATIONS

International Search Report; Application No. PCT/JP2010/065257; Issued: Nov. 17, 2010; Mailing Date: Nov. 30, 2010; 2 pages.

* cited by examiner

*Primary Examiner* — Mark A Deuble
(74) *Attorney, Agent, or Firm* — St. Onge Steward Johnston & Reens

(57) ABSTRACT

Workpiece conveying equipment provided with a workpiece conveying traveling body composed of a workpiece support carriage and an auxiliary carriage adjacent to at least one of the front and the rear in a traveling direction of the workpiece support carriage, a first conveying path where the workpiece support carriage and the auxiliary carriage travel integrally, a second conveying path where only the workpiece support carriage travels perpendicularly and horizontally with respect to the traveling direction of the first conveying path, and a carriage diverging means provided at a branching point from the first conveying path to the second conveying path so as to separate the workpiece support carriage from the auxiliary carriage and to diverge the workpiece support carriage into the second conveying path perpendicularly and horizontally.

5 Claims, 10 Drawing Sheets

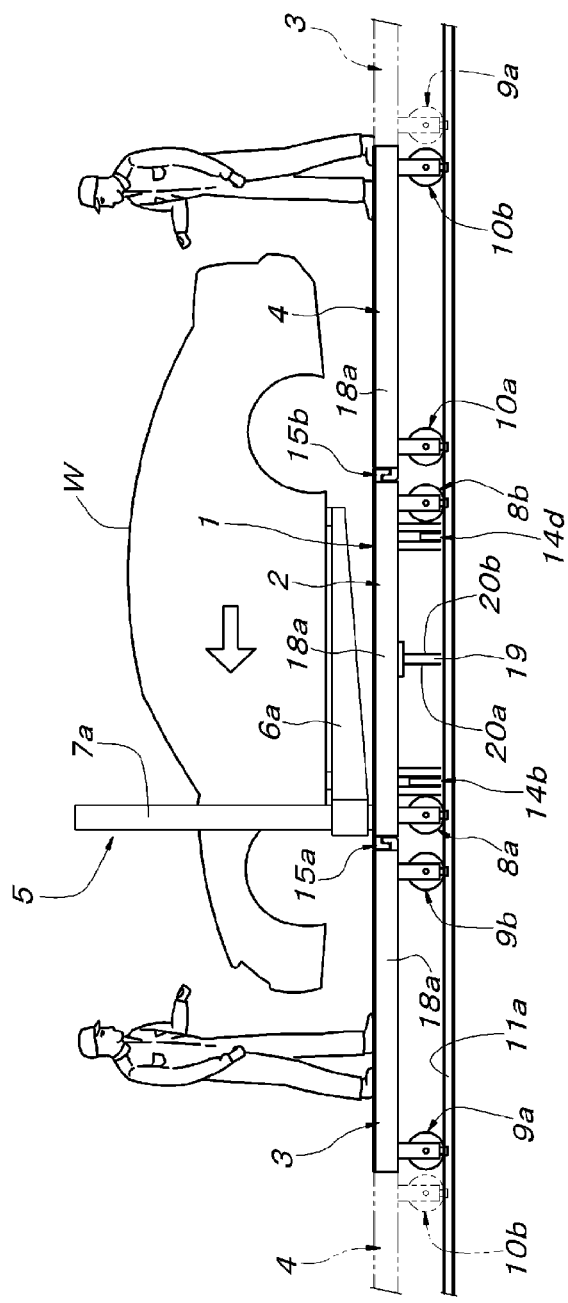
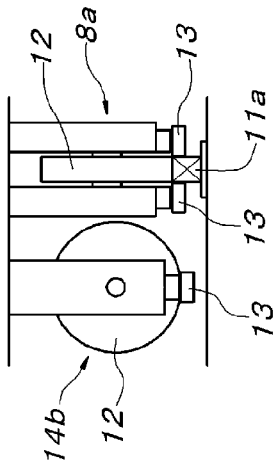
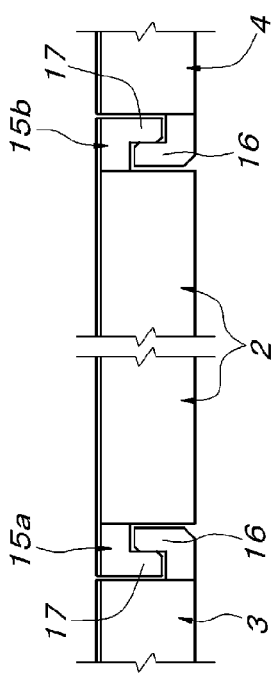
FIG. 2A
FIG. 2C
FIG. 2B

WORKPIECE CONVEYING EQUIPMENT

CROSS-REFERENCE TO RELATED APPLICATIONS

The present application is a continuation of pending International patent application PCT/JP2010/065257 filed on Sep. 6, 2010 which designates the United States and claims priority from Japanese patent application JP2009-212765 filed on Sep. 15, 2009, the content of which is incorporated herein by reference.

FIELD OF THE INVENTION

The present invention relates to workpiece conveying equipment whose workpiece conveying path includes a first conveying path and a second conveying path branched off perpendicularly and horizontally with respect to the first conveying path.

BACKGROUND OF THE INVENTION

The above workpiece conveying equipment is known in automobile assembly lines, for example. The automobile assembly lines for example are configured such that on a first conveying path constituting a trim line or final line where work with respect to a relatively low region of the periphery of an automobile body supported on a conveying carriage is performed, the conveying carriage is made to travel in a longitudinal orientation parallel to the front-rear direction of the supported automobile body, and on a second conveying path constituting a chassis line where work of assembling an engine or an axle unit from beneath the automobile body is performed, the conveying carriage is made to travel in a transverse orientation orthogonal to the front-rear direction of the supported automobile body. Meanwhile, a worker gets on the conveying carriage which supports the automobile body and carries out a required work while walking around the periphery of the supported automobile body on the first conveying path. Therefore, a large conveying carriage having a working floor thereon projecting also before and after the supported automobile body is required. On the second conveying path, on the other hand, attachment-loaded carriages having been loaded with heavy materials such as engines and axle units are entered under the front and rear of the automobile body, and then required works are carried out. For the conveying carriage which travels sideways on this second conveying path, a compact conveying carriage without a working floor projecting laterally in the carriage traveling direction from the front and rear of the automobile body is more favorable since the need to make the heavy attachment-loaded carriages get on and off the conveying carriage is eliminated.

From the above viewpoint, it is conceivable to use a variable-length conveying carriage capable of traveling as a long conveying carriage being long in the front-rear direction at the time of traveling longitudinally on the first conveying path and also capable of shortening the length of the carriage in the front-rear direction corresponding to the left-right direction with respect to the sideways traveling direction at the time of traveling sideways on the second conveying path, or to use a long conveying carriage being long in the front-rear direction and dedicated to the first conveying path and a short conveying carriage being short in the front-rear direction and dedicated to the second conveying path and then to transship the automobile body between the long and the short conveying carriages. As the conventional variable-length conveying carriage usable in the automobile assembly line as described above, there have been known a conveying carriage provided with auxiliary stands before and after a conveying carriage main body thereof which slidably move in and out (a conveying carriage as described in Patent Document 1) and a conveying carriage pivotally supporting auxiliary stands before and after a conveying carriage main body thereof so as to rise and fall, etc.

Patent Document 1: Japanese Published Unexamined Patent Application No. H04-362459

SUMMARY OF THE INVENTION

When the variable-length conveying carriage as described in Patent Document 1 is used, not only does the structure of the entire conveying carriage become complex thereby leading to high cost, but also the size of the auxiliary stands is inevitably restricted since the auxiliary stands are housed in the carriage main body or switched into a hanging posture, so that the effectiveness of the auxiliary stands is reduced. Further, a means for taking out and in the auxiliary stands with respect to the carriage main body and control for automatically operating the means becomes necessary at the branching point from the first conveying path to the second conveying path or at a meeting point from the second conveying path to the first conveying path. Thus, a cost increase in the entire equipment is inevitable. Furthermore, in the latter system where the two kinds of conveying carriages are used to transship the automobile body, a means for transshipping the automobile body and control for automatically operating the means becomes necessary. As a result, not only is a considerable cost increase in the entire equipment inevitable but also a considerable amount of time to transship the automobile body becomes necessary, whereupon an entire operation cycle time is rendered longer and production efficiency is also reduced.

The present invention proposes workpiece conveying equipment capable of solving the afore-described conventional problems. The workpiece conveying equipment according to the present invention includes, described with reference symbols of an embodiment which will be described later, a workpiece conveying path including a first conveying path L1 and a second conveying path L3 branched off perpendicularly and horizontally with respect to the first conveying path L1, a workpiece conveying traveling body 1 composed of a workpiece support carriage 2 and an auxiliary carriage 3 adjacent to at least one of a front and a rear in a traveling direction of the first conveying path L1 of the workpiece support carriage 2, a workpiece conveying traveling body drive means (a friction drive 22) juxtaposed on the first conveying path L1 to make the workpiece support carriage 2 and the auxiliary carriage 3 travel integrally, a carriage diverging means (elevating guide rails 24a and 24b, a divergence friction drive 25, an elevating device 27) arranged at a branching point P1 from the first conveying path L1 to the second conveying path L3 so as to leave the auxiliary carriage 3 on the first conveying path L1 and to diverge and introduce only the workpiece support carriage 2 perpendicularly and horizontally into the second conveying path L3, and a workpiece support carriage drive means (a friction drive 29) juxtaposed on the second conveying path L3 to make the workpiece support carriage 2 travel perpendicularly and horizontally with respect to the traveling direction of the workpiece support carriage 2 on the first conveying path L1.

Effects of the Invention

According to the above configuration of the present invention, a transshipment of the workpiece (automobile body)

between the first and second conveying paths becomes unnecessary by using the first conveying path as a trim line or final line of an automobile assembly line and the second conveying path as a chassis line. Furthermore, the workpiece is conveyed by a long workpiece conveying traveling body into which the workpiece support carriage and the auxiliary carriage adjacent thereto are integrated, on the first conveying path where the workpiece is fed longitudinally in parallel with a front-rear length direction thereof. Thus, a sufficiently large working floor over an entire periphery of the workpiece can be ensured on the workpiece conveying traveling body, and required works on the first conveying path with respect to the periphery of the workpiece can be performed safely and easily by a worker who gets on the workpiece conveying traveling body. It is sufficient at the branching point from the first conveying path to the second conveying path to leave the auxiliary carriage and to diverge and introduce only the workpiece support carriage perpendicularly and horizontally into the second conveying path by the carriage diverging means. On this second conveying path, only the workpiece support carriage short in front-rear length with the auxiliary carriage removed supports and conveys the workpiece sideways. As a result, it also becomes possible to carry out the work without making the attachment-loaded carriages to be entered under the front and rear of the workpiece get on and off the conveying carriage.

The afore-described configuration of the present invention requires, at the branching point from the first conveying path to the second conveying path, a carriage diverging means for leaving the auxiliary carriage and diverging and introducing only the workpiece support carriage perpendicularly and horizontally into the second conveying path. However, this carriage diverging means is naturally a necessary means in equipment where a common conveying carriage is used between the first and second conveying paths and the need to transship the workpiece (automobile body) is eliminated. Even in the equipment requiring such carriage diverging means, a significant cost reduction can be achieved for the entire equipment as much as additional means for taking out and in the auxiliary stands with respect to the carriage main body and control thereover is obviated. Further, as compared with the case of using the auxiliary stands which can be housed in the carriage main body or switched into a hanging state, the auxiliary carriage in the present invention is not restricted in size by the size and strength of the workpiece support carriage serving as the carriage main body, and a large auxiliary carriage with the same width as the workpiece support carriage and with a necessary and sufficient length in the front-rear direction can be used. Thus, the workpiece support carriage fed sideways on the second conveying path keeps its size to a bare minimum enough to be able to support the workpiece stably and also constitutes a large and long workpiece conveying traveling body which ensures a necessary and sufficient working floor at the periphery of the workpiece, especially before and after thereof, when combined with the auxiliary carriage and longitudinally feeding the workpiece on the first conveying path. Accordingly, workability can be increased.

It is noted that the original workpiece conveying traveling body can be reconstituted also in such a manner that an auxiliary carriage dedicated to each of all workpiece support carriages used in the entire workpiece conveying equipment is prepared and when a workpiece support carriage having been diverged from the second conveying path joins the first conveying path again, an auxiliary carriage on standby dedicated to the workpiece support carriage is adjoined to the workpiece support carriage having joined the first conveying path. However, a terminal end of the second conveying path L3 (a terminal end of an inbound second conveying path L4) can be connected perpendicularly to the first conveying path L2 at the meeting point P2 set to adjoin the branching point P1, and an auxiliary carriage drive means (an auxiliary carriage driving friction drive 28) to move the auxiliary carriage 3 having been left on the first conveying path L1 at the branching point P1 to an adjacent position before or after the workpiece support carriage 2 approaching the meeting point P2 and to make the auxiliary carriage 3 wait can be juxtaposed between the branching point P1 and the meeting point P2 adjacent to each other. According to this configuration, it is sufficient to prepare the number of auxiliary carriages which can be combined with workpiece support carriages at least attending on the first conveying path. The auxiliary carriages can be reduced, at the maximum, by the number of workpiece support carriages attending on the second conveying path, and accordingly, the cost of the entire equipment can be reduced. As a matter of course, an auxiliary carriage or auxiliary carriages for one or a plurality of workpiece support carriages may be stored on the path between the branching point and the meeting point where only the auxiliary carriages are made to travel.

The workpiece conveying traveling body 1 can be composed of a workpiece support carriage 2 and an auxiliary carriage 3 or 4 adjacent to only either one of the front or rear in the traveling direction of the first conveying path L1 of the workpiece support carriage 2. However, the workpiece conveying traveling body 1 can also be constituted by combining two auxiliary carriages 3 and 4 adjacent to both front and rear sides in the traveling direction of the first conveying path L1 of the workpiece support carriage 2. According to this configuration, a working floor on the workpiece conveying traveling body ensured at the periphery of the workpiece longitudinally fed on the first conveying path, in particular, the working floor ensured at both the front and rear sides of the workpiece can be remarkably enlarged. At the same time, both the front and rear ends of the workpiece fed sideways on the second conveying path can be projected to both lateral sides largely from both the front and rear ends of the workpiece support carriage. Interference by the workpiece support carriage with the work with respect to both the front and rear ends of the workpiece on the second conveying path can be prevented sufficiently.

Further, the afore-described auxiliary carriage drive means (the auxiliary carriage driving friction drive 28) can be composed of friction drives 28 arranged along the path between the branching point P1 and the meeting point P2 at an interval shorter than an entire length of friction drive surfaces (longitudinal movement friction drive surfaces 18a and 18b) provided to respective auxiliary carriages 3 and 4 so that the auxiliary carriage drive means can frictionally drive the two auxiliary carriages 3 and 4 positioned longitudinally apart, from the branching point P1 to the meeting point P2 while maintaining a space between both the auxiliary carriages 3 and 4. According to this configuration, on the path from the branching point to the meeting point where only the auxiliary carriages are made to travel, the front and rear two auxiliary carriages having been separated from the workpiece support carriage having been located at the intermediate position can be made to travel stably to the next meeting point while keeping the space therebetween, with a relatively simple configuration.

The coupling means to couple the workpiece support carriage and the auxiliary carriage integrally is not essential in the present invention. For example, in the case of the driving system for the workpiece conveying traveling body, employed in the trim line or final line of the conventional automobile assembly line, that is, the system of pushing and driving the workpiece conveying traveling body in such a continuous state that front and rear workpiece conveying traveling bodies abut against each other, the workpiece conveying traveling bodies can be made to travel without problems by maintaining the state that the workpiece support carriage and the auxiliary carriage are adjacent to each other even if the carriages are not coupled to each other. When the workpiece conveying traveling bodies are respectively made to travel at a regular interval at a constant speed or when the workpiece conveying traveling bodies are sent into the branching point one by one, the friction drives may just be arranged at such an interval that the workpiece support carriage and the auxiliary carriage adjacent to each other receive a thrust constantly by friction drive wheels.

The coupling means to couple the workpiece support carriage 2 and the auxiliary carriage 3 integrally is not necessary in the present invention as described above. However, the present invention can be carried out with provision of a coupling means 15a to couple the workpiece support carriage 2 and the auxiliary carriage 3 to each other. According to this configuration, the workpiece conveying traveling body composed of the workpiece support carriage and the auxiliary carriage can be handled in the same manner as the conventional one composed of a single carriage. Even when the workpiece conveying traveling bodies are made to travel at a regular interval at a constant speed or when the friction drive is used in order to send the workpiece conveying traveling bodies into the branching point one by one, for example, one unit of friction drive per workpiece conveying traveling body may just be applied, whereby equipment costs can be reduced. In this case, the coupling between the workpiece support carriage 2 and the auxiliary carriage 3 by the coupling means 15a needs to be released at least at the branching point P1 by some kind of means. This coupling release means can be composed of a cam or a variety of actuators which operate a coupling release operating part provided to the coupling means when the workpiece conveying traveling body reaches the branching point.

The coupling means 15a to couple the workpiece support carriage 2 and the auxiliary carriage 3 together may be of any configuration. The coupling means 15a can be constituted by, for example, an engaging member 17 at the workpiece support carriage 2 side and an engaged member 16 at the auxiliary carriage 3 side vertically fitted to each other while allowing a relative lateral movement between the workpiece support carriage 2 and the auxiliary carriage 3 at the branching point P1. This configuration can release the coupling automatically by means of lateral movement of the workpiece support carriage even when the workpiece support carriage moves laterally toward the second conveying path side at the branching point while keeping the same level as the auxiliary carriage. Thus, the need to separately add the afore-described cam or actuators as the coupling release means is eliminated, and accordingly, the present invention can be carried out inexpensively.

Moreover, when the thus configured coupling means 15a is employed, the carriage diverging means can be composed of a vertically movable elevating guide rail 24a or 24b supporting and guiding the workpiece support carriage 2 along a traveling direction of the second conveying path L3 and a workpiece support carriage diverging drive (a divergence friction drive 25) propelling the workpiece support carriage 2 having been lifted up by the elevating guide rail 24a or 24b into the second conveying path L3, and the engaging member 17 and engaged member 16 of the coupling means 15a can be vertically detached from each other or rendered less in fitting depth when the workpiece support carriage 2 is lifted up by the elevating guide rail 24a or 24b. According to this configuration, the workpiece support carriage can be supported and guided by the elevating guide rail dedicated to the lateral movement and wheels supported by the elevating guide rail and dedicated to the lateral movement, when the workpiece support carriage is laterally moved sideways toward the second conveying path side with respect to the auxiliary carriage at the branching point. Thus, configuring the traveling guide means (the guide rail and the wheels) of the first conveying path side and the traveling guide means (the guide rail and the wheels) used when the workpiece support carriage is laterally moved toward the second conveying path side, so as not to interfere with each other is facilitated as compared with the case where the traveling level of the workpiece conveying traveling body (the workpiece support carriage and the auxiliary carriage) when approaching the branching point on the first conveying path is configured to be the same as the traveling level when the workpiece support carriage is laterally moved sideways toward the second conveying path side with respect to the auxiliary carriage.

BRIEF DESCRIPTION OF THE DRAWINGS

FIG. 2A is a side view of the above;

FIG. 2B is a side view showing a coupling means between a workpiece support carriage and an auxiliary carriage in the workpiece conveying traveling body;

FIG. 2C is a front view showing a wheel unit of the workpiece support carriage;

DETAILED DESCRIPTION OF THE INVENTION

Figure 1:
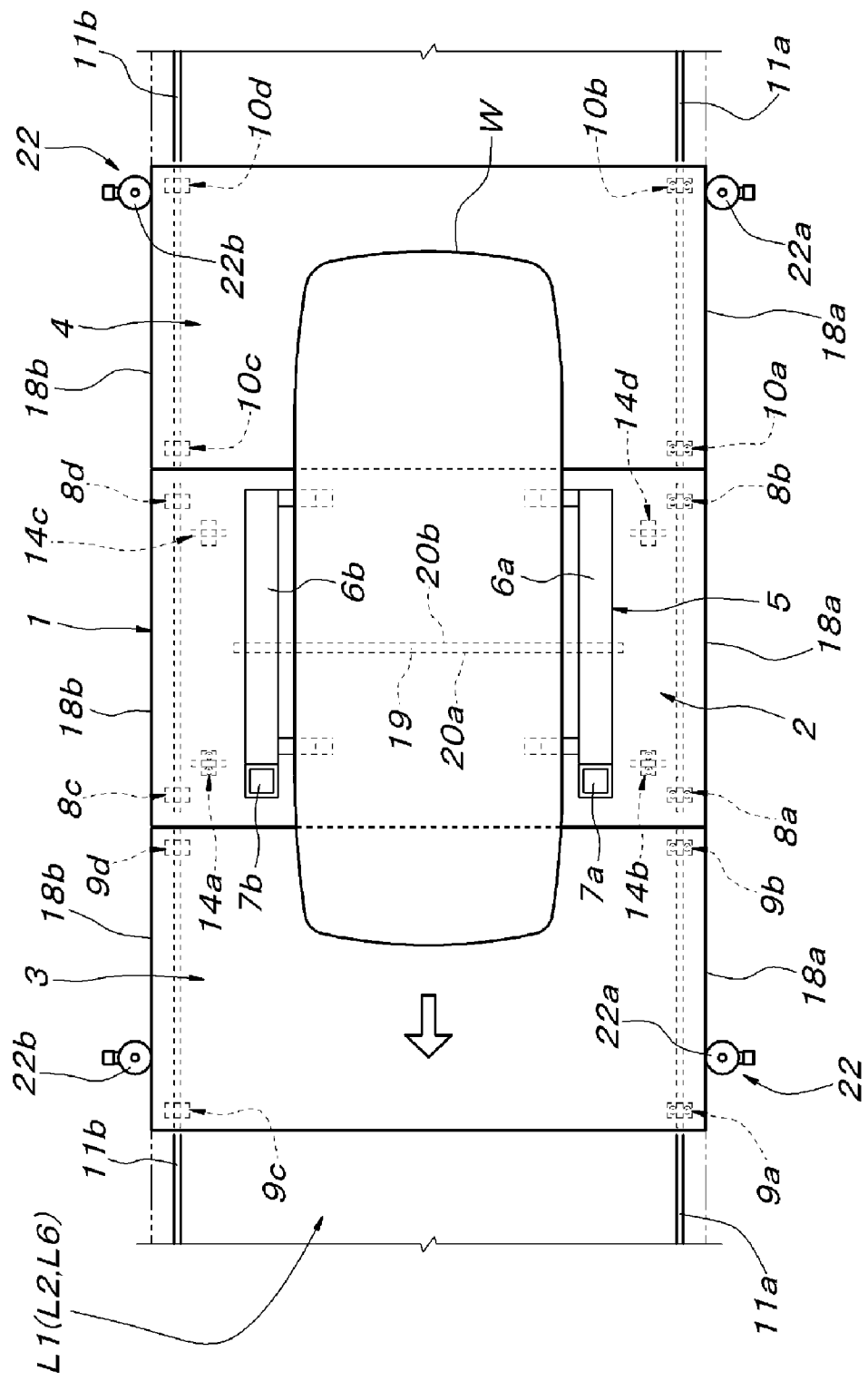
FIG. 1 is a plan view when a workpiece conveying traveling body is on a first conveying path.
Figure 3:
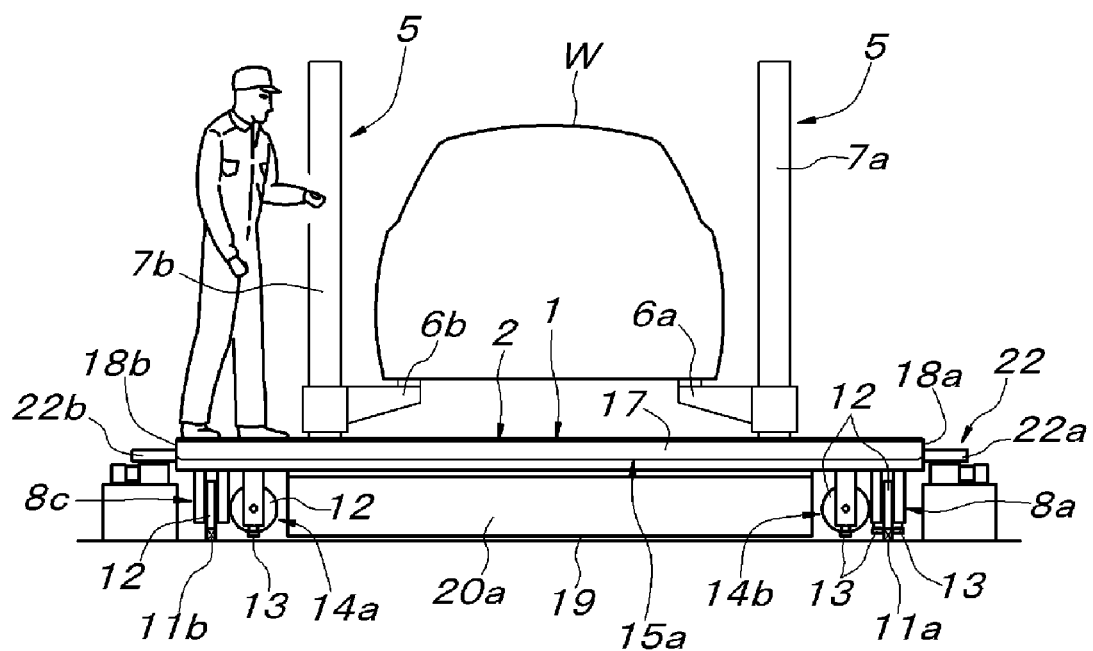
FIG. 3 is a front view when the workpiece support carriage of the workpiece conveying traveling body is on the first conveying path.

As shown in FIGS. 1 to 3, a workpiece conveying traveling body 1 in this embodiment is constituted by a workpiece support carriage 2 and two auxiliary carriages 3 and 4 arranged adjacent to the front and rear in a traveling direction of a first conveying path L1 of the workpiece support carriage 2. The workpiece support carriage 2 has such a horizontally long rectangular shape in plan that a width in a left and right lateral direction is greater than a length in the traveling direction of the first conveying path L1. The workpiece support carriage 2 has an upper surface installed with a workpiece supporting means 5 to support a workpiece (an automobile body) W. The workpiece supporting means 5 is such that a pair of left and right elevating support arms 6a and 6b supporting both left and right lateral surfaces of the workpiece W are respectively supported by columns 7a and 7b so as to be vertically movable. The workpiece W supported by the workpiece supporting means 5 has both front and rear ends thereof projecting forward and rearward from the workpiece support carriage 2. Further, a working floor with a width to the extent that a worker can walk around is ensured between the workpiece supporting means 5 positioned outside both lateral sides of the workpiece W and both left and right lateral sides of the workpiece support carriage 2, when viewed in plan.

The front and rear two auxiliary carriages 3 and 4 have the same size, and a horizontal width thereof is equal to that of the workpiece support carriage 2 and a length thereof in the traveling direction of the first conveying path L1 is long enough to protrude more forwardly and rearwardly outward than the front and rear ends of the workpiece W projecting forward and rearward from the workpiece support carriage 2 when viewed in plan and enough to ensure a working floor to the extent that a worker can walk outside both the front and rear ends of the workpiece W. Although the length of the front and rear two auxiliary carriages 3 and 4 is slightly shorter than that of the workpiece support carriage 2 in the embodiment as shown, the length can also be configured equal to that of the workpiece support carriage 2 or, to the contrary, longer than that of the workpiece support carriage 2.

The workpiece support carriage 2 and the front and rear two auxiliary carriages 3 and 4 have respective four corners at the bottom arranged with longitudinal movement wheel units 8a to 8d, 9a to 9d, and 10a to 10d. The longitudinal movement wheel units 8a to 10d include respective wheels 12 rolling on a pair of left and right guide rails 11a and 11b laid on the first conveying path L1. The wheel units 8a, 8b, 9a, 9b, 10a, and 10b including the wheels 12 rolling on one of the guide rails 11a are each provided with a pair of left and right vertical axis rollers 13 sandwiching the guide rail 11a from both left and right lateral sides for traveling direction control, as shown in FIG. 2C. As a matter of course, a double flanged wheel fitted to the guide rail 11a can be substituted for the wheel 12 of each wheel unit 8a, 8b, 9a, 9b, 10a, or 10b instead of using the above paired left and right vertical axis rollers 13 in combination. Further, a single flanged wheel can be used for each of the wheels 12 to control the traveling directions of respective carriages 2 to 4, as well.

Besides, the afore-described longitudinal movement wheel units 8a to 8d, the workpiece support carriage 2 is arranged with lateral movement wheel units 14a to 14d for traveling perpendicularly and horizontally with respect to the traveling direction of the first conveying path L1, at positions inner and nearer to the center with respect to each of the longitudinal movement wheel units 8a to 8d. These lateral movement wheel units 14a to 14d are of exactly the same configuration as the longitudinal movement wheel units 8a to 8d except that the orientation thereof is 90 degrees different; the lateral movement wheel units 14a to 14d include respective wheels 12, and the lateral movement wheel units 14a and 14b positioned on one side in the lateral moving direction are each provided with a pair of left and right vertical axis rollers 13 for traveling direction control.

Further, coupling means 15a and 15b as shown in FIG. 2B are respectively provided to ends adjacent to each other of the workpiece support carriage 2 and the auxiliary carriages 3 and 4. The coupling means 15a and 15b are each composed of an engaged member 16 arranged so as to project from the end of the auxiliary carriage 3 or 4 across the entire width thereof and having an L shape in longitudinal section, and an engaging member 17 arranged so as to project from each end of the workpiece support carriage 2 across the entire width thereof, fitted to the engaged member 16 at the auxiliary carriage 3 or 4 from above, and having an inverted L shape in longitudinal section. The engaging member 17 is composed so as to be vertically fittable to and separable from the engaged member 16 and also relatively fittable and separable in the width direction of the respective carriages 2 to 4.

Respective left and right lateral surfaces of the workpiece support carriage 2 and auxiliary carriages 3 and 4, which lateral surfaces are parallel to the traveling direction of the first conveying path L1, serve as longitudinal movement friction drive surfaces 18a and 18b. A strip plate member 19 perpendicular and horizontal to the traveling direction of the first conveying path L1 is arranged so as to project in the center of the bottom of the workpiece support carriage 2, and vertical both lateral surfaces of the strip plate member 19 form lateral movement friction drive surfaces 20a and 20b, aside from the longitudinal movement friction drive surfaces 18a and 18b.

Figure 4:
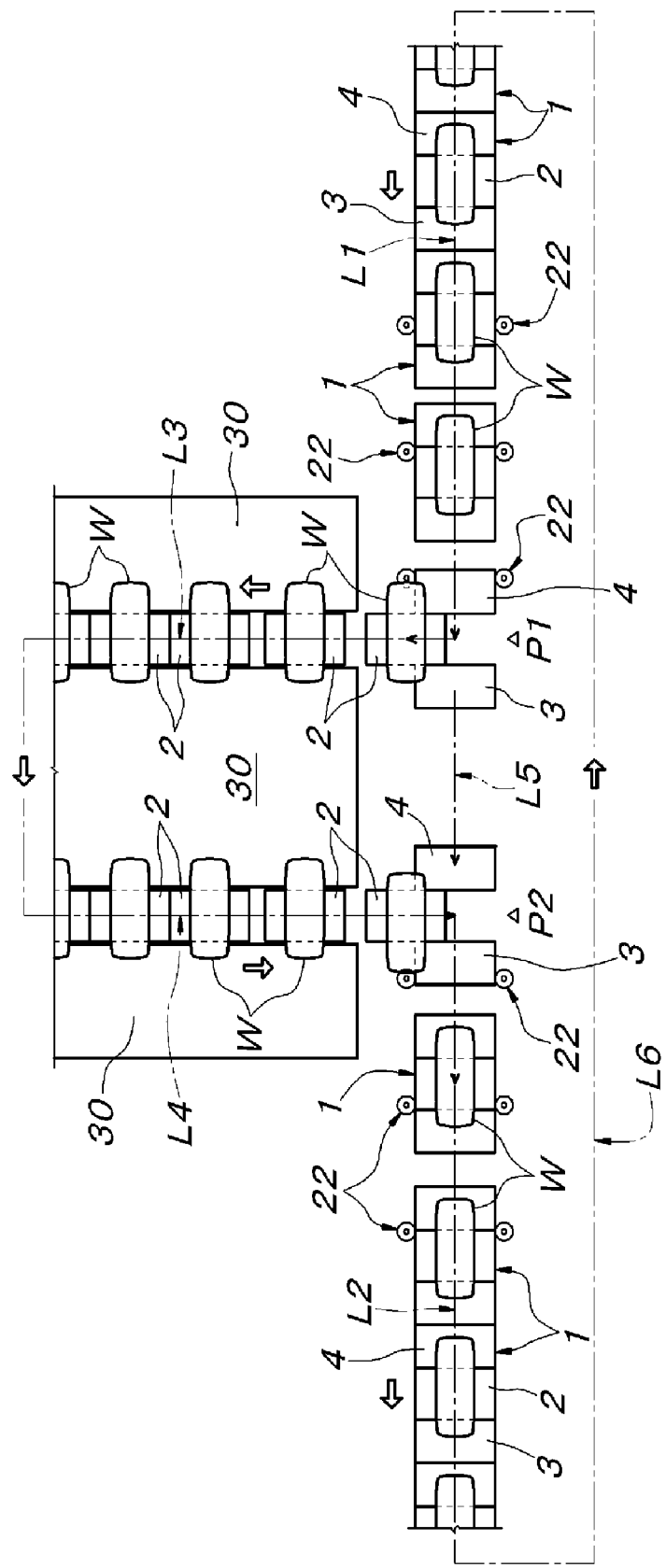
FIG. 4 is a plan view explaining a layout of entire workpiece conveying equipment.
Figure 5:
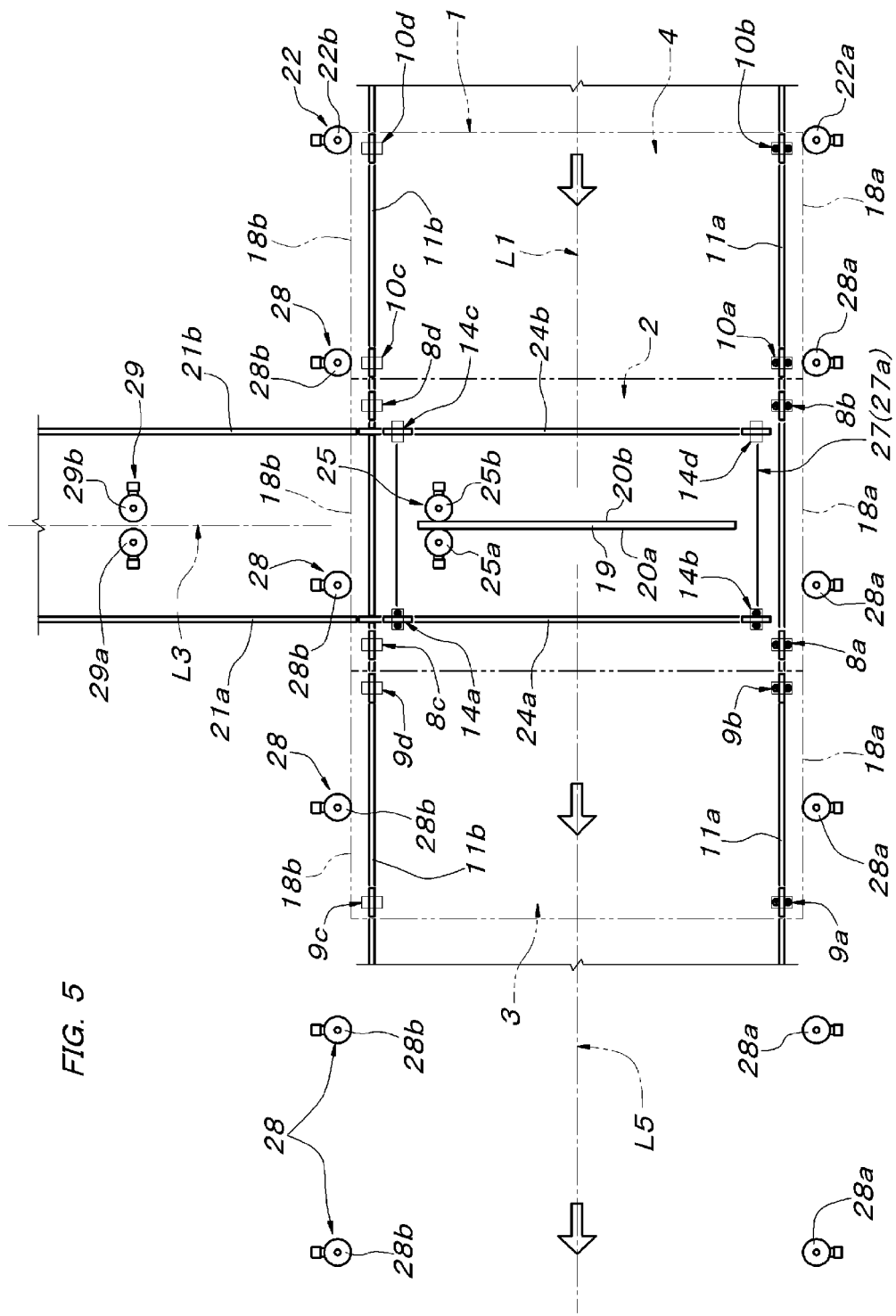
FIG. 5 is a plan view explaining a main part of a configuration in a state where the workpiece conveying traveling body reaches a branching point from the first conveying path to a second conveying path.
Figure 6:
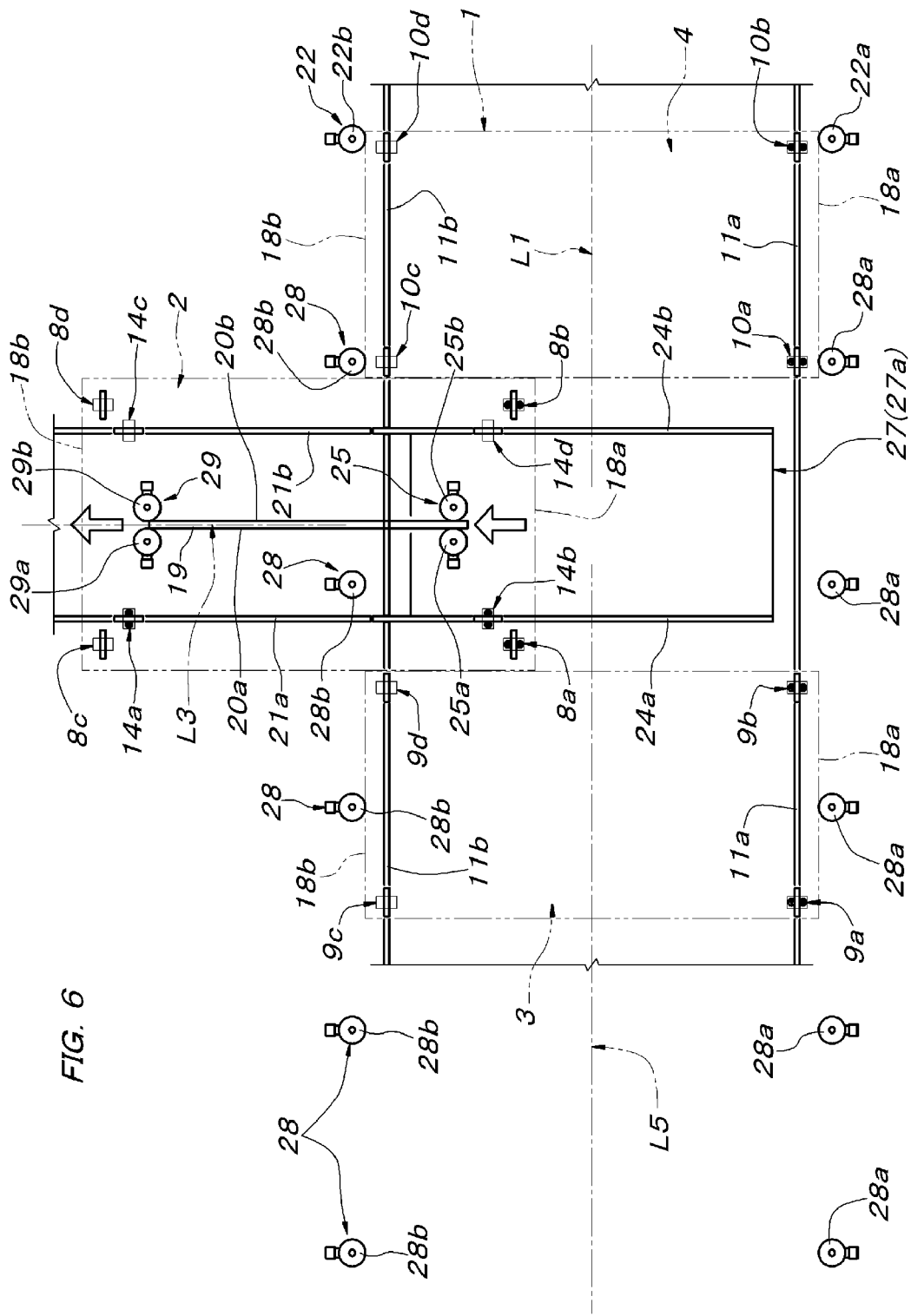
FIG. 6 is a plan view explaining a main part of a configuration in a state where the workpiece support carriage of the workpiece conveying traveling body is sent out into the second conveying path from the branching point.
Figure 7:
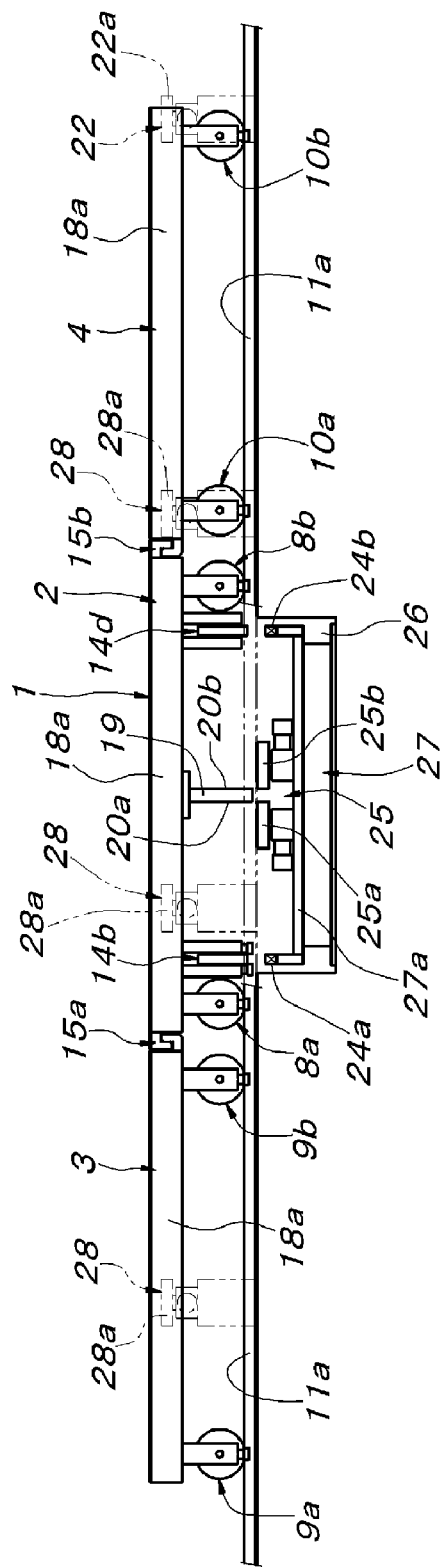
FIG. 7A is a longitudinal sectional side view of the state shown in FIG. 5.
FIG. 7B is a side view showing a state where the workpiece support carriage is lifted by elevating guide rails from the state of FIG. 7A.
Figure 8:
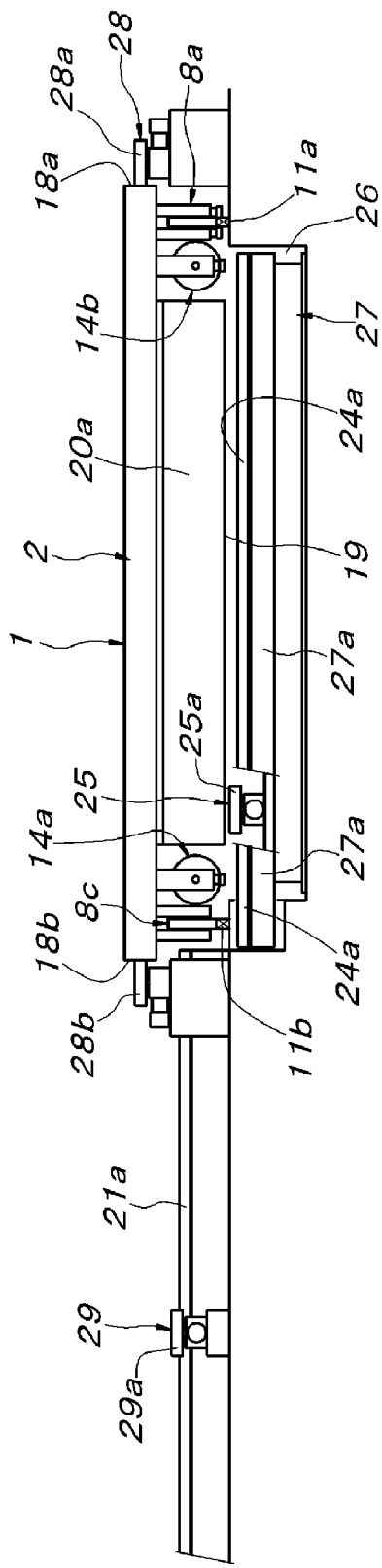
FIG. 8A is a front view of the state shown in FIG. 5.
FIG. 8B is a front view showing a state where the workpiece support carriage is lifted by elevating guide rails from the state of FIG. 8A.

Next, a workpiece conveying path where the workpiece conveying traveling body 1 configured as above travels will be described. As shown in FIG. 4, the workpiece conveying path in this embodiment includes an upstream first conveying path L1 and a downstream first conveying path L2 in series in the same straight line, an outbound second conveying path L3 perpendicularly and horizontally branched off from a terminal end of the upstream first conveying path L1, and an inbound second conveying path L4 connected to a terminal end of the outbound second conveying path L3 and perpendicularly joining a beginning end of the downstream first conveying path L2. Further, a linear auxiliary carriage traveling path L5 is constituted between a branching point P1 from the upstream first conveying path L1 to the outbound second conveying path L3 and a meeting point P2 from the inbound second conveying path L4 to the downstream first conveying path L2. When the workpiece conveying path is used as an automobile assembly line, the upstream first conveying path L1 can be used as a trim line, and the outbound second conveying path L3 and the inbound second conveying path L4 can be used as chassis lines, and the downstream first conveying path L2 can be used as a final line. Further, a terminal end of the downstream first conveying path L2 and a beginning end of the upstream first conveying path L1 are connected by a linear continuous inbound first conveying path L6.

A pair of left and right guide rails 11a and 11b which the wheels 12 provided to respective longitudinal movement wheel units 8a to 8d, 9a to 9d, and 10a to 10d of the carriages 2 to 4 of the workpiece conveying traveling body 1 roll on are laid on the upstream first conveying path L1, the downstream first conveying path L2, and the inbound first conveying path L6. A pair of left and right guide rails 21a and 21b which the wheels 12 provided to the lateral movement wheel units 14a to 14d of the workpiece support carriage 2 roll on are laid on the outbound second conveying path L3 and the inbound second conveying path L4. Further, friction drives 22 to propel the workpiece conveying traveling body 1 via respective longitudinal movement friction drive surfaces 18a and 18b of the carriages 2 to 4 continuing across the entire length of the workpiece conveying traveling body 1 are juxtaposed on the upstream first conveying path L1, the downstream first conveying path L2, and the inbound first conveying path L6, as shown in FIG. 1 and FIG. 3. The friction drives 22 are each composed of motor-driven friction drive wheels 22a and 22b respectively pressure-contacted with the longitudinal movement friction drive surfaces 18a and 18b on both left and right lateral sides.

An installation interval in the traveling path direction between the friction drives 22 is set accordingly as the workpiece conveying traveling bodies 1 are made to travel in a bumper to bumper state where front and rear workpiece conveying traveling bodies 1 abut against each other or as the workpiece conveying traveling bodies 1 are made to travel one by one while keeping a predetermined space therebetween, as conventionally known. The workpiece conveying traveling body 1 driven by the motor-driven friction drive wheels 22a and 22b of the friction drives 22 travels the upstream first conveying path L1 toward the branching point P1 and stops at a fixed position where the workpiece support carriage 2 is positioned at the branching point P1. There are arranged at this branching point P1 a pair of left and right elevating guide rails 24a and 24b positioned immediately below the lateral movement wheel units 14a to 14d of the workpiece support carriage 2 of the workpiece conveying traveling body 1 having stopped at the fixed position and a vertically movable divergence friction drive 25 positioned immediately below the vicinity of one of ends of the strip plate member 19, which end is closer to the outbound second conveying path L3, as shown in FIGS. 5 to 8. The divergence friction drive 25 includes motor-driven friction drive wheels 25a and 25b pressure-contactable with the lateral movement friction drive surfaces 20a and 20b which are both lateral surfaces of the strip plate member 19.

The elevating guide rails 24a and 24b and the divergence friction drive 25 are installed on an elevating base 27a of an elevating device 27 installed inside an underfloor pit 26 located immediately below the branching point P1. The elevating base 27a is supported by an elevating guide mechanism so as to be elevatable vertically and parallelly. The elevating device 27 drives the elevating base 27a to move vertically between a descent limit and an ascent limit by an appropriate actuator. The elevating guide rails 24a and 24b and divergence friction drive 25 having been lowered to the descent limit are located lower than the lateral movement wheel units 14a to 14d and strip plate member 19 of the workpiece support carriage 2 approaching the branching point P1 as shown in FIG. 7A and FIG. 8A, so that the former do not interfere with the latter. Further, there are juxtaposed on the auxiliary carriage traveling path L5 from the branching point P1 to the meeting point P2 a plurality of auxiliary carriage driving friction drives 28 driving the auxiliary carriages 3 and 4 of the workpiece conveying traveling body 1 having stopped at the fixed position at the branching point P1 to the meeting point P2 while keeping a space between both auxiliary carriages 3 and 4. Each auxiliary carriage driving friction drive 28 has the same configuration as the friction drive 22 and includes a pair of left and right motor-driven friction drive wheels 28a and 28b pressure-contacted with respective longitudinal movement friction drive surfaces 18a and 18b of the carriages 3 and 4. The auxiliary carriage driving friction drives 28 are plurally arranged in parallel along the auxiliary carriage traveling path L5 at an interval shorter than the entire length in the traveling direction of the auxiliary carriages 3 and 4 (the entire length of respective longitudinal movement friction drive surface 18a and 18b of the carriages 3 and 4).

Once the workpiece conveying traveling body 1 reaches the branching point P1 and stops, the elevating device 27 is operated to raise the elevating guide rails 24a and 24b and the divergence friction drive 25 from the descent limit position to the ascent limit position. As a result of this, the elevating guide rails 24a and 24b vertically and parallelly lift up the workpiece support carriage 2 having stopped at the fixed position at the branching point P1 via respective wheels 12 of the lateral movement wheel units 14a to 14d of the workpiece support carriage 2. At the same time, the strip plate member 19 of the workpiece support carriage 2 is relatively fitted between the paired motor-driven friction drive wheels 25a and 25b of the divergence friction drive 25, whereupon the paired motor-driven friction drive wheels 25a and 25b are pressure-contacted with both the left and right lateral movement friction drive surfaces 20a and 20b of the strip plate member 19.

It is noted that the paired motor-driven friction drive wheels 25a and 25b of the divergence friction drive 25 are preferably configured to maintain a laterally opened state until reaching the ascent limit position and to close at the same time as reaching the ascent limit position and come into pressure-contact with both the left and right lateral movement friction drive surfaces 20a and 20b of the strip plate member 19. As a matter of course, the divergence friction drive 25 can be installed on a fixed frame but not on the elevating base 27a so as for, among the paired motor-driven friction drive wheels 25a and 25b, the wheel 25a which is positioned at the downstream side of the first conveying path L1 to be at a height enough to receive the strip plate member 19 of the workpiece support carriage 2 having stopped at the fixed position at the branching point P1 and so as for the other motor-driven friction drive wheel 25b which is positioned at the upstream side of the first conveying path L1 may be configured to be movable between an active position of sandwiching the strip plate member 19 with the friction drive wheel 25a and a retract position of being located lower than a moving path in the traveling direction of the upstream first conveying path L1 of the strip plate member 19.

In either case, when the workpiece support carriage 2 is lifted up to a fixed level by the elevating guide rails 24a and 24b at the branching point P1, ends of the elevating guide rails 24a and 24b on the outbound second conveying path L3 side pass through notched divided portions provided to one of the guide rails 11a and 11b of the upstream first conveying path L1 traversing the branching point P1, which guide rail 11b is located closer to the outbound second conveying path L3, and the ends are then connected with the paired left and right guide rails 21a and 21b laid on the outbound second conveying path L3, as shown in FIG. 7B and FIG. 8B. Further, as lifted up to the fixed level, the workpiece support carriage 2 is separated higher than the motor-driven friction drive wheel 28b among the motor-driven friction drive wheels 28a and 28b of the auxiliary carriage driving friction drives 28 arranged at a constant interval on the auxiliary carriage traveling path L5, which friction drive 28b is located at a position of overlapping with a lateral moving path of the workpiece support carriage 2 diverged and laterally moving toward the outbound second conveying path L3 from the branching point P1. Furthermore, the coupling means 15a and 15b between the workpiece support carriage 2 and the auxiliary carriages 3 and 4 are brought into a coupling released state where the engaging members 17 at the workpiece support carriage 2 side are separated upward from the engaged members 16 at the auxiliary carriages 3 and 4 side.

Thus, the motor-driven friction drive wheels 25a and 25b of the divergence friction drive 25 are operated in this state, whereupon the workpiece support carriage 2 having been lifted up to the fixed level receives a propulsive force from the divergence friction drive 25 via the strip plate member 19 and moves laterally toward the outbound second conveying path L3, perpendicularly and horizontally from the branching point P1. The motor-driven friction drive wheel 28b of the auxiliary carriage driving friction drive 28, located at the position of overlapping with the lateral moving path of the workpiece support carriage 2 at this moment is provided at a position allowed to relatively pass below the workpiece support carriage 2 without interfering with the longitudinal movement wheel units 8a to 8d, lateral movement wheel units 14a to 14d, and strip plate member 19 provided to the bottom of the workpiece support carriage 2 when the workpiece support carriage 2 moves laterally toward the outbound second conveying path L3.

Figure 9:
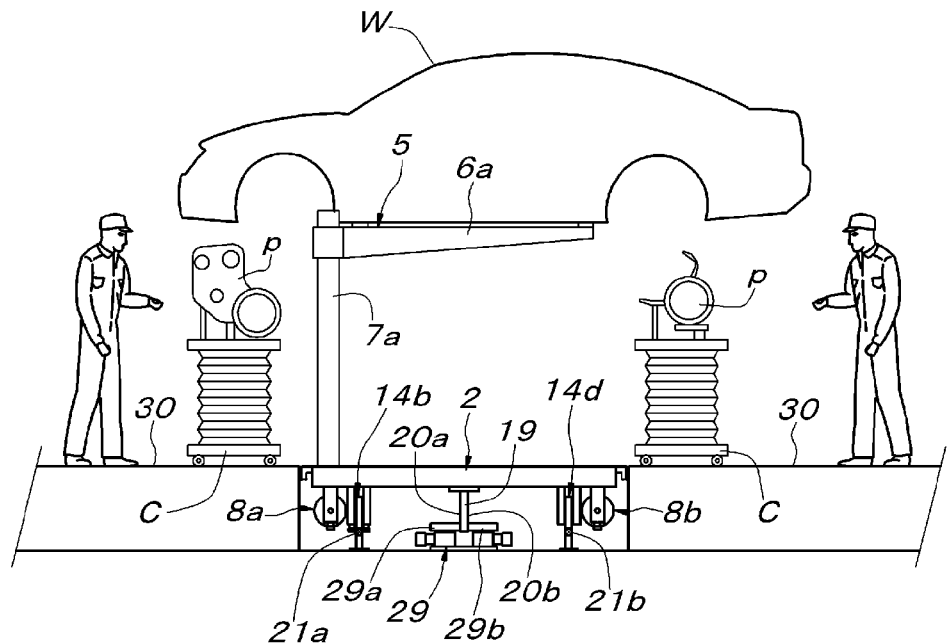
FIG. 9 is a rear view showing the workpiece support carriage on the second conveying path.
Figure 10:
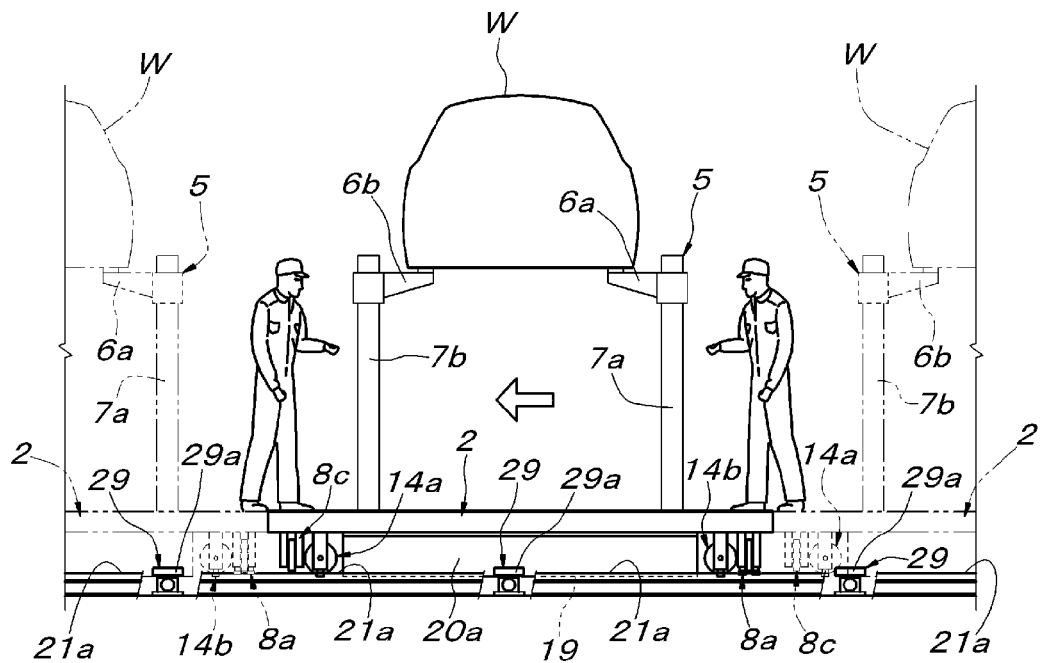
FIG. 10 is a side view showing the workpiece support carriage on the second conveying path.
Figure 11:
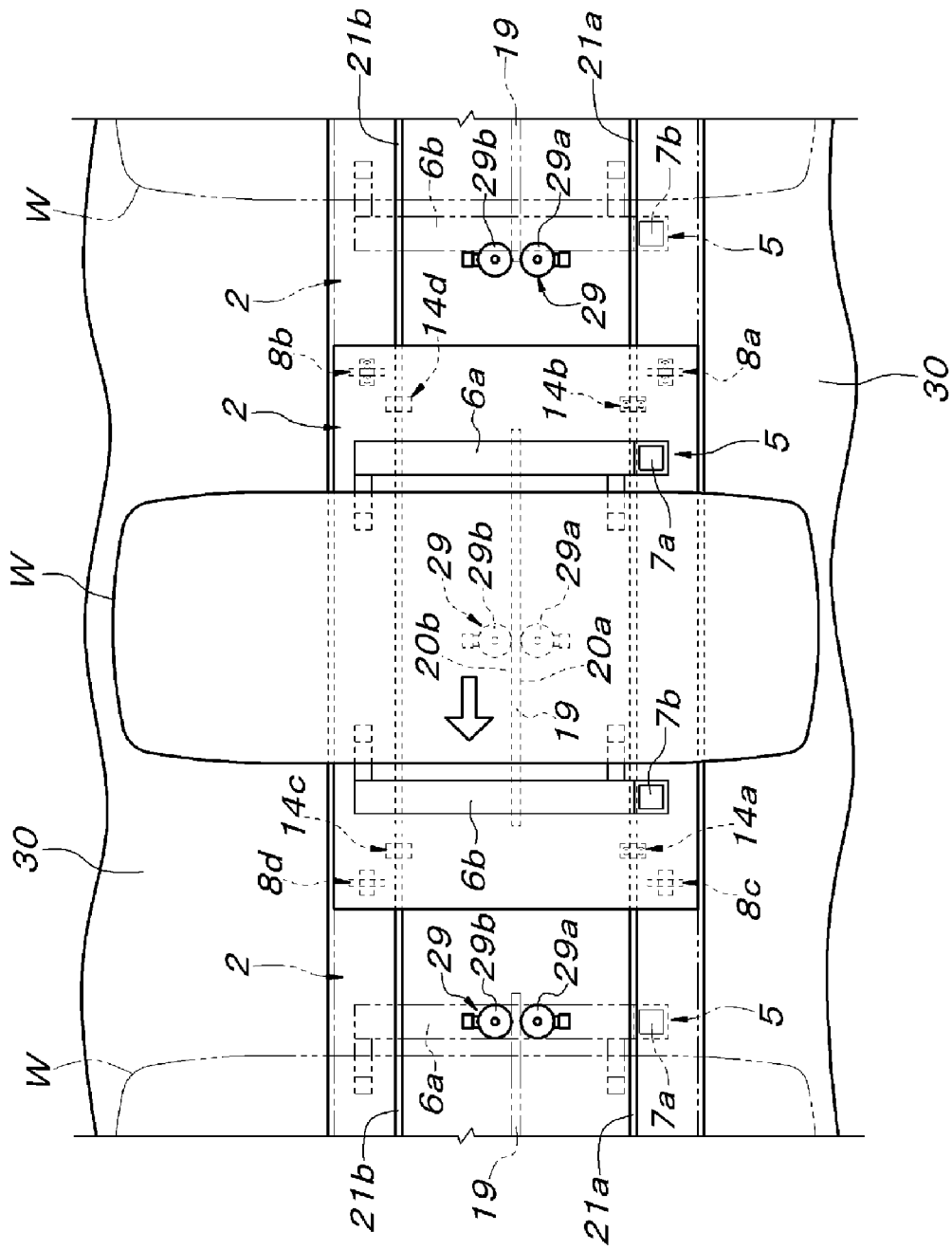
FIG. 11 is a plan view showing the workpiece support carriage on the second conveying path.

The outbound second conveying path L3 and the inbound second conveying path L4 are juxtaposed with friction drives 29 driving the workpiece support carriage 2 via the strip plate member 19 thereof, as shown in FIGS. 9 to 11. The friction drives 29 each include motor-driven friction drive wheels 29a and 29b pressure-contacted with the lateral movement friction drive surfaces 20a and 20b at both sides of the strip plate member 19. An installation interval in the traveling path direction between the friction drives 29 is set accordingly as the workpiece support carriages 2 are made to travel in a bumper to bumper state where front and rear workpiece support carriages 2 abut against each other or as the workpiece support carriages 2 are made to travel one by one while keeping a predetermined space therebetween in the same manner as the friction drives 22 juxtaposed on the first conveying paths L1, L2, and L6. When the workpiece support carriage 2 is sent into the outbound second conveying path L3 from the branching point P1 by the divergence friction drive 25, the strip plate member 19 thereof enters between motor-driven friction drive wheels 29a and 29b of the first friction drive 29 before the motor-driven friction drive wheels 25a and 25b of the divergence friction drive 25 are detached from the strip plate member 19 (the lateral movement friction drive surfaces 20a and 20b). Subsequently, the workpiece support carriage 2 travels the outbound second conveying path L3 sideways by the friction drives 29 provided on the outbound second conveying path L3.

The workpiece support carriage 2 having transferred from the inbound second conveying path L3 to the inbound second conveying path L4 is driven by the friction drives 29 juxtaposed on the outbound second conveying path L4, and the carriage 2 travels the inbound second conveying path L4 in a direction opposed to when traveling the outbound second conveying path L3. The workpiece support carriage 2 is then sent out to the meeting point P2 to the downstream first conveying path L2 by the last friction drive 29 juxtaposed on the inbound second conveying path L4.

On the other hand, the front and rear two auxiliary carriages 3 and 4 having been left at the branching point P1 are sent out on the auxiliary carriage traveling path L5 up to the downstream meeting point P2 by the auxiliary carriage driving friction drives 28 after the workpiece support carriage 2 is sent out from the branching point P1 to the outbound second conveying path L3. That is, the auxiliary carriage driving friction drives 28 are plurally arranged in parallel along the auxiliary carriage traveling path L5 at an interval shorter than the entire length in the traveling direction of the auxiliary carriages 3 and 4 (the entire length of respective longitudinal movement friction drive surfaces 18a and 18b of the carriages 3 and 4). Thus, when the auxiliary carriage driving friction drives 28 are operated to drive respective auxiliary carriages 3 and 4 toward the meeting point P2 by the motor-driven friction drive wheels 28a and 28b pressure-contacted with respective left and right both longitudinal movement friction drive surfaces 18a and 18b of the auxiliary carriages 3 and 4, both the front and rear auxiliary carriages 3 and 4 travel on the auxiliary carriage traveling path L5 toward the downstream meeting point L2 while keeping a space therebetween as much as the length in the traveling direction of the upstream first conveying path L1 of the workpiece support carriage 2. The auxiliary carriage driving friction drives 28 are arranged so as to send the two auxiliary carriages 3 and 4 into fixed positions before and after the meeting point P2. The two auxiliary carriages 3 and 4 are sent into the fixed positions both before and after the meeting point P2 from the inbound second conveying path L4 to the downstream first conveying path L2 and then stop.

On the other hand, the meeting point P2 is provided with elevating guide rails, a meeting friction drive, and an elevating device vertically driving those, all identical to the elevating guide rails 24a and 24b, divergence friction drive 25, and elevating device 27 vertically driving those provided to the branching point 1, although the illustration is omitted. Thus, when the workpiece support carriage 2 is sent out to the meeting point P2 from the inbound second conveying path L4 by the last friction drive 29 in the state where the auxiliary carriages 3 and 4 are waiting at the fixed two positions before and after the meeting point P2 of the downstream first conveying path L2 as described above, the elevating guide rails, meeting friction drive, and elevating device vertically driving those provided to the meeting point P2 are driven by operations reverse to those of the elevating guide rails 24a and 24b, divergence friction drive 25, and elevating device 27 vertically driving those at the branching point P1, whereupon the workpiece support carriage 2 having been sent out from the inbound second conveying path L4 is taken over by the elevating guide rails at the ascent limit positions by means of the meeting friction drive and then sent into a fixed position of the meeting point 2. After that, the elevating guide rails are lowered, and the longitudinal movement wheel units 8a to 8d of the workpiece support carriage 2 are transferred to both the left and right guide rails 11a and 11b of the downstream first conveying path L2 and also the meeting friction drive escapes downward from the strip plate member 19 of the workpiece support carriage 2. Additionally, the engaging members 17 of the coupling means 15a and 15b at the workpiece support carriage 2 side are fitted into the engaged members 16 at the auxiliary carriages 3 and 4 side from above.

Once the workpiece support carriage 2 is sent from the inbound second conveying path L4 between the waiting front and rear two auxiliary carriages 3 and 4 and the carriages 2 to 4 are coupled respectively on the guide rails 11a and 11b of the downstream first conveying path L2 by the coupling means 15a and 15b thereupon being reconstituted to the original workpiece conveying traveling body 1 at the meeting point P2 in the afore-described manner, the friction drives 22 arranged on the downstream first conveying path L2 are operated, and the workpiece conveying traveling body 1 can be driven to travel on the downstream first conveying path L2. The workpiece conveying traveling body 1 having reached the terminal end of the downstream first conveying path L2 can be sent back to the upstream first conveying path L1 after being made to pass through the inbound first conveying path L6.

As obvious from the above description, the auxiliary carriages 3 and 4 exist below both the front and rear ends in the conveying direction of the workpiece (automobile body) W supported on the central workpiece support carriage 2 via the workpiece supporting means 5, when the workpiece conveying traveling body 1 with the auxiliary carriages 3 and 4 coupled to both the front and rear sides of the workpiece support carriage 2 travels the circulation path composed of the upstream first conveying path L1, the downstream first conveying path L2, and the inbound first conveying path L6, as shown in FIGS. 1 to 3. Thus, a worker can easily and safely perform a variety of works with respect to a peripheral side portion of the workpiece (automobile body) W by utilizing a wide working floor formed by the three carriages 2 to 4 lined in the forward and rearward traveling direction and projecting from the entire periphery of the workpiece (automobile body) W while getting on the workpiece conveying traveling body 1. As a matter of course, the height of the supported workpiece (automobile body) W can be adjusted to be optimum according to the work content, at this moment, by raising or lowering the elevating support arms 6a and 6b of the workpiece supporting means 5.

The workpiece (automobile body) W having reached the terminal end of the upstream first conveying path L1 (the branching point P1) is perpendicularly and horizontally sent out to the outbound second conveying path L3 only by the workpiece support carriage 2 supporting the workpiece (automobile body) W and then is conveyed sideways on the outbound second conveying path L3 and the inbound second conveying path L4 continuing thereto. At this moment, both the front and rear ends of the workpiece (automobile body) W largely project from the workpiece support carriage 2 laterally with respect to the conveying direction as shown in FIGS. 9 to 11. Thus, fixed working floors 30 are laid on respective lateral sides of the outbound and inbound second conveying paths L3 and L4 at substantially the same level as the floor surface of the workpiece support carriage 2, and the support height of the workpiece (automobile body) W on the workpiece support carriage 2 is maximized by raising the elevating support arms 6a and 6b of the workpiece supporting means 5, thereby allowing work carriages C loaded with large assembly parts p such as engines and axle units to be made to travel to positions under both the front and rear ends of the workpiece (automobile body) W on the fixed working floors 30 and allowing the work of attaching the large assembly parts p on the work carriages C to bottom portions of both the front and rear ends of the workpiece (automobile body) W to be performed on the safe fixed working floors 30.

It is noted that the driving system for making the workpiece conveying traveling body 1 travel on the circulation path composed of the upstream first conveying path L1, the downstream first conveying path L2, and the inbound first conveying path L6, the driving system for making the workpiece support carriage 2 sideways travel on the outbound second conveying path L3 and the inbound second conveying path L4, the driving system for sending out the workpiece support carriage 2 from the branching point P1 to the outbound second conveying path L3, the driving system for sending the workpiece support carriage 2 into the meeting point P2 from the inbound second conveying path L4, and the driving system for making the front and rear two auxiliary carriages 3 and 4 travel on the auxiliary carriage traveling path from the branching point P1 to the meeting point 2 while maintaining a fixed space therebetween, etc., should not be restricted to the friction driving system as shown in the afore-described embodiment. Even when the friction driving system is employed, the friction drives 22, 25, 28, and 29 of the embodiment are not restrictive. Although the friction drives each including a pair of motor-driven friction drive wheels 22a and 22b, 25a and 25b, 28a and 28b, or 29a and 29b respectively pressure-contacted with the friction drive surfaces 18a and 18b or 20a and 20b of the driven counterpart are shown in the embodiment, the friction drives may be, for example, of such a structure that the driven counterpart is sandwiched between a motor-driven friction drive wheel and a back-up roller and may be in some cases composed only of motor-driven friction drive wheels pressure-contacted with only one of friction drive surfaces of the driven counterpart.

Further, a lifting range of the workpiece support carriage 2 by the elevating guide rails 24a and 24b can be rendered small depending on the configuration of the drive which drives the auxiliary carriages 3 and 4 from the branching point P1 to the meeting point P2 on the auxiliary carriage traveling path L5. When the lifting range is rendered small as just described, the workpiece support carriage 2 laterally moves perpendicularly and horizontally with respect to the auxiliary carriages 3 and 4 without the engaged members 16 and engaging members 17 of the coupling means 15a and 15b completely detached from each other in the vertical direction, and the engaged members 16 and engaging members 17 of the coupling means 15a and 15b relatively slide laterally while fitted to each other vertically. Thus, for example, the engaged members 16 fitted inside the engaging members 17 of the coupling means 15a and 15b are composed of a plurality of vertical axis rollers arranged in parallel in the length direction of the engaging members 17, whereby frictional resistance at the time when the coupling of the coupling means 15a and 15b is released can be reduced. As a matter of course, the coupling means 15a and 15b are not essential to the present invention and the structure thereof is not restricted even when provided. The workpiece support carriage 2 and the auxiliary carriages 3 and 4 can be made to travel integrally with both the front and rear sides of the workpiece support carriage 2 adjoined to the auxiliary carriages 3 and 4, depending on the configuration of the drive for making the workpiece conveying traveling body 1 travel on the circulation path composed of the upstream first conveying path L1, the downstream first conveying path L2, and the inbound first conveying path L6. Thus, the coupling means 15a and 15b may be eliminated in such a case.

INDUSTRIAL APPLICABILITY

The workpiece conveying equipment of the present invention can be utilized effectively as an automobile assembly line composed of a trim line and a final line where the work with respect to a peripheral side portion of an automobile body is performed and a chassis line where assembling work of assembling large assembly parts conveyed by carriages, such as engines and axle units, to the underside of both the front and rear ends of the automobile body is performed.

What is claimed is:
1. Workpiece conveying equipment comprising:
   a workpiece conveying path including a first conveying path and a second conveying path branched off perpendicularly and horizontally with respect to the first conveying path;
   a workpiece conveying traveling body having a workpiece support carriage and an auxiliary carriage adjacent to at least one of a front and a rear in a traveling direction of the first conveying path of the workpiece support carriage;

a workpiece conveying traveling body drive means juxtaposed on the first conveying path to make the workpiece support carriage and the auxiliary carriage travel integrally;

a carriage diverging means arranged at a branching point between the first conveying path and the second conveying path so as to leave the auxiliary carriage on the first conveying path and to diverge and introduce only the workpiece support carriage perpendicularly and horizontally into the second conveying path;

a workpiece support carriage drive means juxtaposed on the second conveying path to make the workpiece support carriage travel perpendicularly and horizontally with respect to the traveling direction of the workpiece support carriage on the first conveying path;

a terminal end of the second conveying path coupled perpendicularly with respect to the first conveying path at a meeting point set so as to adjoin the branching point; and an auxiliary carriage drive means juxtaposed between the branching point and the meeting point adjacent to each other so as to move the auxiliary carriage having been left on the first conveying path at the branching point to an adjacent position before or after the workpiece support carriage approaching the meeting point and to make the auxiliary carriage wait.

2. The workpiece conveying equipment according to claim 1, wherein the workpiece conveying traveling body is composed of the workpiece support carriage and two auxiliary carriages adjacent to both the front and rear sides in the traveling direction of the first conveying path of the workpiece support carriage, and the auxiliary carriage drive means is composed of friction drives arranged along a path between the branching point and the meeting point at an interval shorter than an entire length of friction drive surfaces provided to the respective auxiliary carriages so that the auxiliary carriage drive means frictionally drives the two auxiliary carriages positioned longitudinally apart, from the branching point to the meeting point while maintaining a space between both the auxiliary carriages.

3. Workpiece conveying equipment comprising
a workpiece conveying path including a first conveying path and a second conveying path branched off perpendicularly and horizontally with respect to the first conveying path;

a workpiece conveying traveling body having a workpiece support carriage and an auxiliary carriage adjacent to at least one of a front and a rear in a traveling direction of the first conveying path of the workpiece support carriage;

a workpiece conveying traveling body drive means juxtaposed on the first conveying path to make the workpiece support carriage and the auxiliary carriage travel integrally;

a carriage diverging means arranged at a branching point between the first conveying path and the second conveying path so as to leave the auxiliary carriage on the first conveying path and to diverge and introduce only the workpiece support carriage perpendicularly and horizontally into the second conveying path;

a workpiece support carriage drive means juxtaposed on the second conveying path to make the workpiece support carriage travel perpendicularly and horizontally with respect to the traveling direction of the workpiece support carriage on the first conveying path; and a coupling means to couple the workpiece support carriage and the auxiliary carriage together, wherein coupling of the coupling means is released at the branching point.

4. The workpiece conveying equipment according to claim 3, wherein the coupling means is composed of an engaging member at the workpiece support carriage side and an engaged member at the auxiliary carriage side, the engaging member and the engaged member vertically fitted to each other while allowing a relative lateral movement between the workpiece support carriage and the auxiliary carriage at the branching point.

5. The workpiece conveying equipment according to claim 4, wherein the carriage diverging means is provided with a vertically movable elevating guide rail supporting and guiding the workpiece support carriage in a traveling direction of the second conveying path and a workpiece support carriage diverging drive propelling the workpiece support carriage having been lifted up by the elevating guide rail into the second conveying path, and the engaging member and the engaged member of the coupling means are vertically detached from each other or rendered less in fitting depth when the workpiece support carriage is lifted up by the elevating guide rail.

* * * * *